（12） United States Patent
Winkler et al.

(10) Patent No.: US 12,188,295 B2
(45) Date of Patent: Jan. 7, 2025

(54) METHOD AND DEVICE FOR WELDING AT LEAST TWO PROFILED SECTIONS FOR WINDOW OR DOOR FRAMES OR LEAVES

(71) Applicant: Rotox Holding GmbH, Brechen (DE)

(72) Inventors: Albert Winkler, Rolbing (FR);
Alexander Luft, Kaiserslautern (DE);
Christian Denk, Schonau (DE)

(73) Assignee: Rotox Holding GmbH, Brechen (DE)

(*) Notice: Subject to any disclaimer, the term of this patent is extended or adjusted under 35 U.S.C. 154(b) by 35 days.

(21) Appl. No.: 18/043,060

(22) PCT Filed: Aug. 11, 2021

(86) PCT No.: PCT/EP2021/072354
§ 371 (c)(1),
(2) Date: Feb. 27, 2023

(87) PCT Pub. No.: WO2022/048872
PCT Pub. Date: Mar. 10, 2022

(65) Prior Publication Data
US 2023/0313600 A1 Oct. 5, 2023

(51) Int. Cl.
*E06B 3/96* (2006.01)
*B29C 65/00* (2006.01)
(Continued)

(52) U.S. Cl.
CPC ............ *E06B 3/9608* (2013.01); *B29C 65/20* (2013.01); *B29C 65/203* (2013.01);
(Continued)

(58) Field of Classification Search
CPC .............. B29C 65/203; B29C 65/2023; B29C 65/2053; B29C 66/022; B29C 66/0224; B29C 66/02241
See application file for complete search history.

(56) References Cited

U.S. PATENT DOCUMENTS 2,387,566 A * 10/1945 Custers ................... B29C 66/43
156/499
10,293,423 B2    5/2019 Würfel
(Continued)

FOREIGN PATENT DOCUMENTS

CA         2945712 A1     4/2017
DE    102012110658 A1 *  5/2013  ............ B29C 37/04
(Continued)

OTHER PUBLICATIONS

English machine translation for EP3339006 (Year: 2017).*
English translation for DE102012110658 (Year: 2012).*

*Primary Examiner* — Scott W Dodds
(74) *Attorney, Agent, or Firm* — Rogowski Law LLC

(57) ABSTRACT

A method and a device (10) for welding at least two profiled sections (1) for window or door frames or leaves uses a heating unit (4) introduced between the profiled sections (2, 3) to be joined. At least two heating elements (5, 6) of the heating unit melt the profiled section ends (2, 3) at the end surfaces to be joined. In order to chamfer, in particular remove, a profiled section edge layer (20) of the profiled section ends (2, 3) along the layer surfaces (12, 13) thereof, at least one tool, in particular at least one cutting blade (7, 8), is arranged on the heating elements (5, 6) and is moved such that the material (9) to be melted is displaced into the profiled section interior (11) or into the interior (12) of the profiled section chambers (13). A compression device compresses the profiled section ends (2, 3).

10 Claims, 14 Drawing Sheets

(51) Int. Cl.
*B29C 65/20* (2006.01)
*B29C 65/74* (2006.01)
*B29K 27/06* (2006.01)
*B29L 31/00* (2006.01)
*E06B 3/22* (2006.01)

(52) U.S. Cl.
CPC ...... *B29C 65/743* (2013.01); *B29C 66/02241* (2013.01); *B29C 66/1162* (2013.01); *B29C 66/326* (2013.01); *B29C 66/52431* (2013.01); *B29C 66/7252* (2013.01); *B29C 66/73921* (2013.01); *B29C 66/81435* (2013.01); *B29C 66/836* (2013.01); *B29K 2027/06* (2013.01); *B29L 2031/003* (2013.01); *B29L 2031/005* (2013.01); *E06B 3/22* (2013.01)

(56) References Cited

U.S. PATENT DOCUMENTS

| | | | |
|---|---|---|---|
| 10,479,026 | B2 | 11/2019 | Denk |
| 2015/0101746 | A1* | 4/2015 | Vaccari .................. B29C 65/30 156/499 |
| 2017/0203500 | A1 | 7/2017 | Vaccari |
| 2018/0222122 | A1 | 8/2018 | Vaccari |
| 2020/0386041 | A1* | 12/2020 | Daun .................. B29C 66/1162 |

FOREIGN PATENT DOCUMENTS

| | | | | |
|---|---|---|---|---|
| DE | 102012112533 | A1 | 7/2013 | |
| DE | 102015000908 | A1 | 7/2016 | |
| DE | 102015107121 | A1 | 11/2016 | |
| DE | 102015013430 | A1 | 4/2017 | |
| DE | 102016102240 | A1 | 8/2017 | |
| DE | 102016104785 | A1 | 9/2017 | |
| DE | 102017127483 | A1 * | 5/2019 | ............. B29C 65/18 |
| DE | 102018133638 | A1 | 7/2020 | |
| EP | 0264052 | A2 * | 4/1988 | ........... E06B 3/9604 |
| EP | 3117981 | A1 | 1/2017 | |
| EP | 3339006 | A1 * | 6/2018 | |
| EP | 3403809 | A1 | 11/2018 | |
| EP | 3403810 | A1 | 11/2018 | |
| KR | 20170111059 | A * | 10/2017 | ............... E06B 3/00 |
| WO | 2013132406 | A1 | 9/2013 | |
| WO | 2017137467 | A1 | 8/2017 | |

* cited by examiner

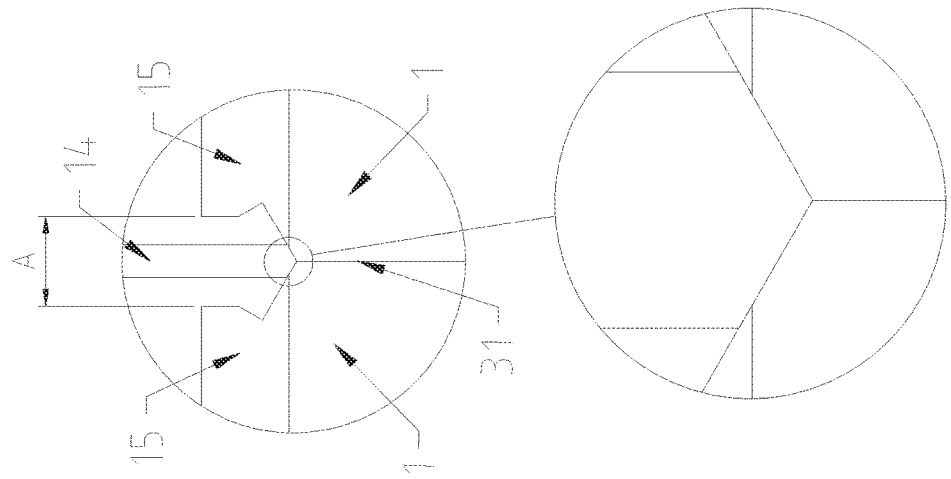
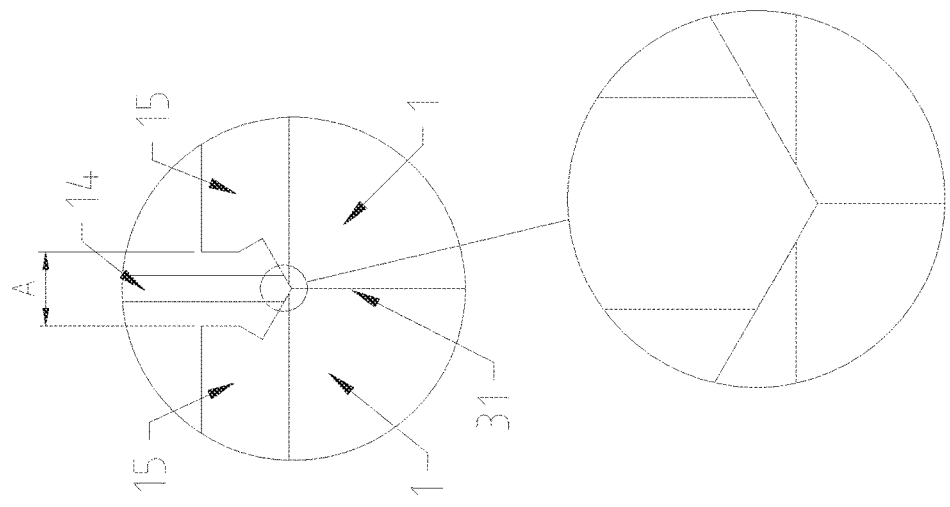
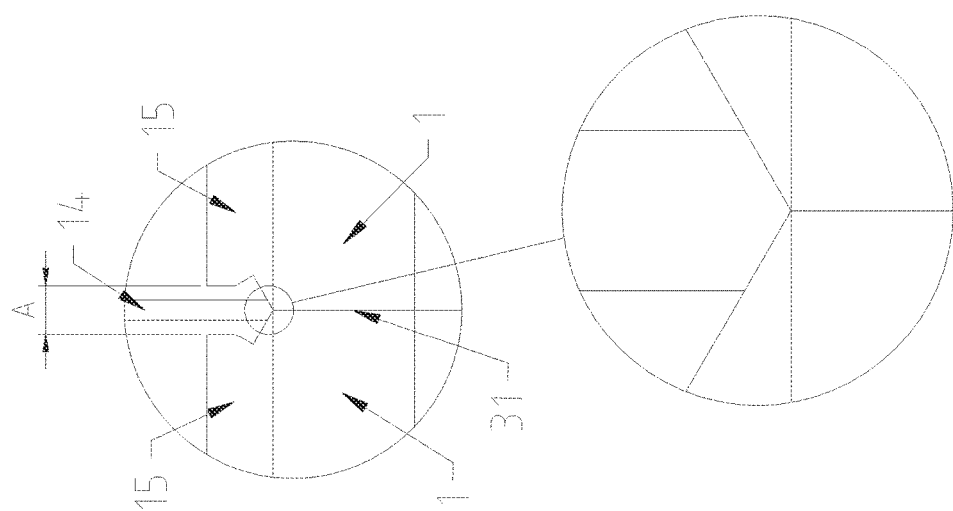
Fig. 12

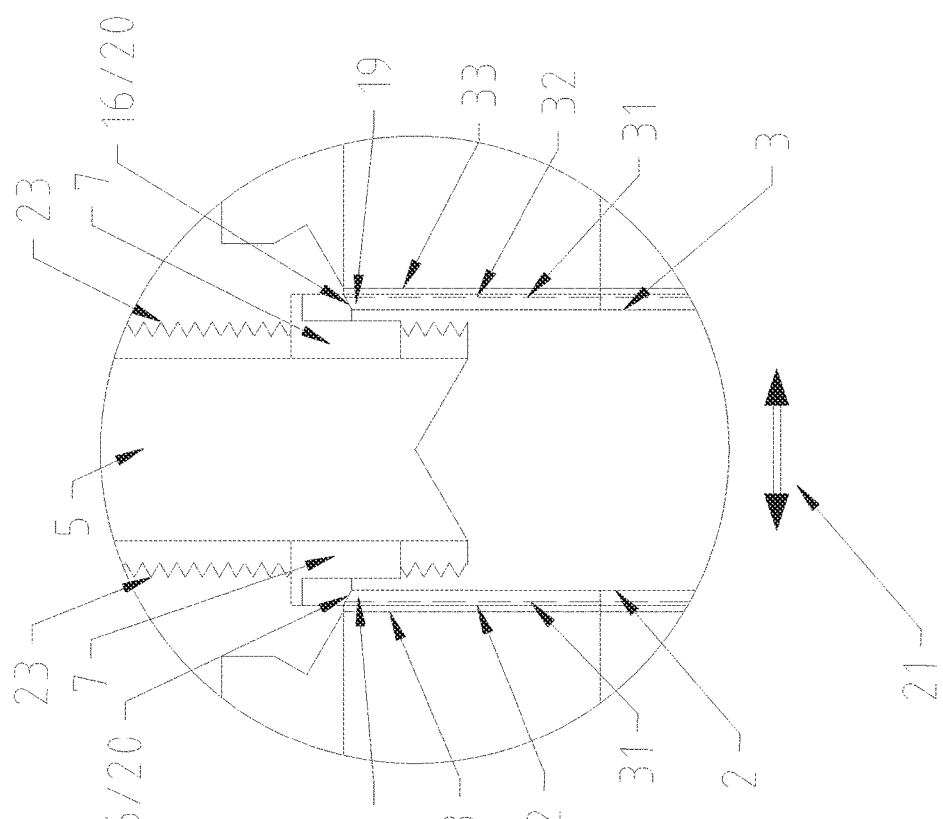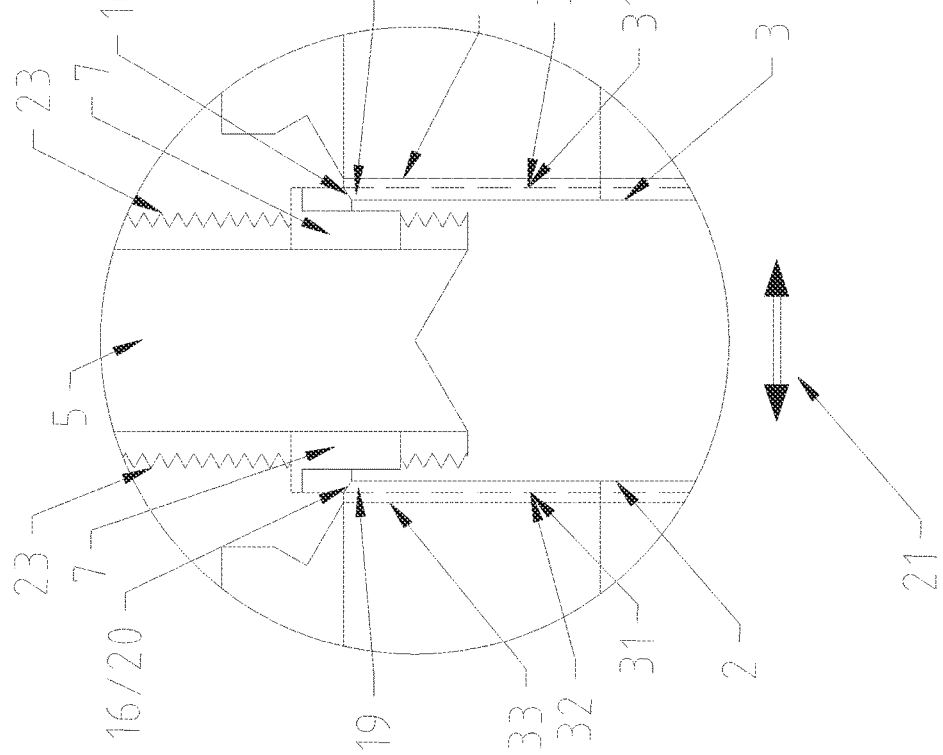
Fig. 13

METHOD AND DEVICE FOR WELDING AT LEAST TWO PROFILED SECTIONS FOR WINDOW OR DOOR FRAMES OR LEAVES

CROSS-REFERENCE TO RELATED APPLICATIONS

This application is a national stage application (under 35 USC § 371) of PCT/EP2021/072354, filed Aug. 11, 2021, which claims benefit of DE 102020123272.1, filed Sep. 7, 2020, the contents of each of which is incorporated by reference herein.

BACKGROUND OF THE INVENTION

Technical Field and State of the Art

The invention relates to a method for welding at least two profiles for window or door frames and casements or leaves as well as an apparatus for welding at least two profiles.

Methods and apparatuses of the kind mentioned above are known, for example, from DE 10 2015 107 121 A1 and are used in particular for welding PVC profile rods into workpieces in the form of window or door frames and casements or leaves. For this purpose, the profile rods are cut to the respective required lengths before welding in order to subsequently connect the profile parts or profiles to one another by welding at the interfaces forming the joining surfaces. If necessary, the profile parts can be cut at a miter so that the miter interfaces form the joining surfaces.

The actual welding of the profile parts within the meaning of the present invention takes place by melting and subsequent joining of the joining surfaces on the profile rod ends. For this purpose, the profile parts to be welded are first placed in a corresponding clamping apparatus and positioned in relation to one another with the aid of stops and guides in the apparatus. Then, in a melting step, the joining surfaces are pressed against the heating surface of a heating element of the welding apparatus. During the heating and leveling step that then takes place, the material of the respective profile part is melted at its joining surface, so that the melt required for the weld connection, i.e. material that has become liquid or doughy due to the effect of heat, is produced. By pressing the joining surface against the heating element, the so-called leveling, any unevenness on the joining surface is also melted away.

During the subsequent adjustment, the heating element between the profile parts is removed before they are joined. The joining takes place by bringing the two profile parts into contact and swaging them, wherein the melted joining surfaces are moved towards one another in the joining direction and pressed against one another. The still hot, preferably thermoplastic material of the two profile parts, i.e. the melt, is thus contacted and forms a stable weld connection after it has cooled down. Such a method sequence is described, for example, in DE 10 2012 112 533 A1.

The joining partners themselves are excessively longer than the future finished dimension of the connected elements of the workpiece. To form the melt, part of this excess, the so-called burn-off, is melted off on the heating element. A further part of the excess softens during the melting step and is swaged to the intended final dimensions in the subsequent joining step. The ratio of excess with respect to melting and swaging is variable. Depending on the type of profile used, the burn-off can be selected to be larger or smaller in order to always provide sufficient melt for a reliable weld connection.

During the melting step on the heating element, the material of the profile part on the joining surface, for example PVC, begins to flow and deform. The melt, which is displaced by pressing the profile part against the heat reflector, also moves laterally outwards over the edge of the joining surface up to the outer surfaces, in particular beyond the visible surfaces of the profile part.

The visible surfaces of the profile part are those outer surfaces that are visible when the workpiece is finished and installed. In the case of windows or doors, these are the surfaces of the individual profile parts that are visible in the window or door plane. Fastening elements, e.g. fittings, or other workpiece elements, e.g. window panes, can be arranged and fastened on the functional surfaces of the profile parts, which generally extend transversely or perpendicularly to the visible surfaces.

In known connection methods, the material of the profile parts escaping as excess melt cools down during the joining and forms a weld bead at the connection point of the profile parts. However, such a weld bead on the outer surfaces of the profile part, in particular on the visible surfaces, counteracts the dimensional accuracy of the workpiece as well as a high-quality impression. Therefore, after a certain cooling time, the weld bead is removed in downstream machines, for example buffing machines, for example by milling of shadow grooves or by flush tapping along the weld.

Lately, film or laminate profiles are also being used for the production of window or door frames and casements or leaves in order to easily furnish them with different colors or decors. In the case of such profiles, the necessary postprocessing of weld beads in the joining region is difficult, because the thin films or laminate layers can easily be damaged by mechanical processing. In automated or semi-automated processes, in particular, this can result in increased number of rejects, which raises costs. By removing the weld bead, the underlying base material of the profile part, which differs in color from the film or the laminate, becomes visible, which must be concealed by hand in a corresponding color.

For a number of years, production has pursued the achievement of welding profiles, in particular those with a decor, which result in visually appealing visible surfaces, wherein there is no weld seam extending beyond the visible surface that needs to be trimmed and/or recolored.

Approaches from the more recent prior art seek to prevent the formation of an outer weld bead from the outset by influencing the flow of the melt in a targeted manner before and/or during the joining. For example, the respective profile can be narrowed with limiting elements, such as limiting blades, in order to reduce or prevent the escaping of melt through the visible surfaces. This is proposed, for example, in the publications DE 20 2015 000 908 U1, DE 10 2015 107 121 A1, DE 10 2016 102 240 A1, and DE 10 2016 104 785 A1. Some of these apparatuses have molded parts that can be moved before and/or during the melting step in order to influence the melt. The aim is either to prevent melt from escaping and/or to move melt that has already escaped back towards or onto the joining surface of the respective profile, so that a weld bead does not even begin to form during the subsequent joining.

A problem that occurs here is impurities of the melt, for example with dirt particles that can have accumulated on the profile edge layer as a result of the storage of the profiles, as well as melt material of the protective films. These are located on the visible surfaces of the profiles and serve to protect against transport damage and the effects of building materials and are removed locally in an additional work step before the melting step in the case of the more recent solutions of the prior art.

Despite these additional measures, a gap often remains between the respective limiting element and the profile part, through which gap the melt can flow, so that the development of a weld bead cannot always be reliably suppressed. After cooling, any weld beads that appear must therefore still be removed in an additional work step. The production effort and the production costs therefore cannot be reduced to the desired extent.

DE 10 2018 133 638 A1 discloses an apparatus and a method for welding two profile rods made of plastic. After the profile rods have been provided, at least one profile rod is processed, in particular in its miter region, with a tapping blade. Before heating, the profile rod is to be processed by a milling cutter, in particular a surface milling cutter. The profile rods are then heated at least on their miter surfaces, and subsequently the miter surfaces of the profile rods are brought together in such a way that the heated regions of the miter surfaces result in a material-locking connection between the profile rods.

A method for welding at least two profiles so as to form a frame part is known from EP 3 403 809 A1. The welding surfaces of the profiles are heated by a heating unit. There is a relative movement between the heating surface and at least one welding surface in a welding plane that runs substantially parallel to the at least one welding surface.

A method for welding at least two profiles so as to form a frame is also known from EP 3 403 810 A1. The welding surfaces of the profiles are heated by a heating unit. Furthermore, a pressure unit exerts a pressure on the profiles in their respective welding section, in particular at the borders of the profiles and the heating plate.

The disadvantage of the prior art is that possible impurities on the profile surface can still be found on the surface during the melting process and can get into the melt and thus into the joining zone, which has a disadvantageous effect on the corner strength of the joint and the appearance of the future window or door frame.

SUMMARY OF THE INVENTION

Against this background, the invention addresses the problem of specifying a method and an apparatus by means of which the corner strength of the joined profiles can be increased. Furthermore, the visual appearance of the joining region of the window or door frame and casement or leaf is to be further improved.

Accordingly, according to a first embodiment of the invention, a method for connecting at least two profile parts is provided, in particular for producing window or door frames and casements or leaves made of a thermoplastic material, having the following steps:
- providing at least two profiles, which are connected to one another at joining surfaces of the profile ends,
- positioning a heating unit having at least two heating elements between the profile ends to be joined,
- chamfering, in particular ablating a profile profile edge layer ends, preferably at least up to the melt path along their visible surfaces by means of at least one tool arranged on the heating elements of the heating unit, in particular by means of at least one cutting blade,
- delivering the profile ends to be joined together onto the heating unit,
- melting the profile ends on their future joining surfaces by means of at least one heating surface arranged on the heating elements,
- moving the heating elements in such a way that the melt material is displaced into the profile interior or into the interior of the profile chambers of the profiles,
- removing the heating unit between the profile ends to be joined, and
- swaging the profile ends against one another so that the profiles are joined together.

The at least two profiles are therefore initially provided, which are connected to one another at the joining surfaces of the profile ends. The heating unit having at least two heating elements is positioned between the profile ends to be joined.

For an attractive appearance and high corner strength, the visible surfaces must be processed at the miter cut. For this purpose, the profile ends are chamfered, and in particular a profile edge layer, for example the decorative/protective film or other impurities, for example due to transport and storage, are ablated in this region. This is done by the at least one tool arranged on the heating elements of the heating unit, in particular by means of at least one cutting blade. For this reason, the heating unit has at least two heating elements, on each of which a tool, for example a cutting blade, is arranged.

The removal of the profile edge layer with its impurities and/or the decorative/protective film is therefore important in order to achieve an optimal strength of the weld connection. This is because the decorative/protective film can lead to non-adhesion of the profile ends during the joining process Particles/substances can also accumulate in the melt due to the impurities, which are disadvantageous for the weld connection.

In particular, it can be provided that, for safe removal of the decorative/protective film, the ablation depth on the profile when viewed in the miter direction is the same as at least the melt end path during the melting process. On the other hand, the swaging residual mass can remain unprocessed.

The geometry of the mechanically ablated chip is designed as a bevel (chamfer). On the one hand, this has the advantage that less material is ablated, which leads to an increase in corner strength, because more material volume is available. On the other hand, the direction of flow of the melt material in the melting process is better guided in the necessary direction, i.e. into the profile interior or the profile chambers.

After the chamfering, i.e. the ablation of the profile edge layer, the profile ends to be joined are delivered onto the heating unit and melted at their subsequent joining surfaces by means of at least one heating surface arranged on the heating elements.

The melting step means the pressing of the profiles onto the heating element, for example a heat reflector, wherein the material of the profile located on the joining surface is melted on or melted off by the heating. The profile becomes shorter by the so-called burn-off, i.e. by the material of the profile that becomes liquid or doughy and deflects laterally under the influence of the pressure force. Because the joining surface of the profile is pressed against the mostly flat heating element, any unevenness on the joining surface of the profile is made consistent or even leveled out. The melt escaping laterally passes into the regions in which a limiting element touches and/or rests on the outer surface of the profile, beyond the separating edge, and cools down more quickly there than on the joining surface. This portion of the melt that is not required to produce the weld connection is referred to as the excess melt.

In the case of colored film or laminate profiles, the excess melt that escapes, in particular on the visible surfaces, can also contain portions of the melted decorative film or decorative layer in addition to the base material of the profile. This can contain different materials, the properties of which can deviate from the base material of the profile. The base material of the profile usually consists of a thermoplastic material, such as PVC, while that of the decorative film or decorative layer is partly made of other plastics. A decorative film can consist, for example, of a pigmented PVC semi-rigid film and/or can be coated with printing ink, which can be laminated with a transparent acrylate film to protect it against the weather.

In addition, portions of melted protective film can be contained in the excess melt. The protective film can be made of a different material, such as LDPE, and is releasably attached to the profiles with an adhesive. In addition, due to the production, transport, and/or storage of the profiles, impurities such as dust and dirt particles can be present, which can get into the connecting surface. Most of the visible surfaces of the profiles are usually covered with protective films in order to prevent damage to the profiles and the workpieces made from them during transport and installation. The protective film usually reaches into the region of the excess melt, unless it has been removed in a previous step.

In order to avoid this mixing of the protective film, decorative film, and/or impurities with the excess melt, which is disadvantageous for the corner strength, the profile is chamfered in a preceding method step; in particular, the profile edge layer of the profile ends is preferably ablated at least up to the melt path along their visible surfaces.

One advantage of this embodiment of the invention is, in particular, that the impurities contained in the excess melt and the melt components that have already cooled down more and are only present as a doughy mass are no longer mixed with the melt required for the actual joining. This gives the weld connection a high quality. Studies have shown that, in this way, the strength values of corner joints can be greatly increased compared to known corner joints, in which a weld bead is also to be avoided. Effort-intensive post-processing, especially on the visible surfaces of the profiles, can be reduced to a minimum or even completely avoided. This is true even when the protective film has not been removed locally beforehand.

After melting, the heating elements are moved in such a way that the melt material is pushed into the profile interior or into the interior of the profile chambers of the profiles in order to ensure an attractive appearance of the joint.

What is a substantial advantage for this embodiment of the invention is that the heating unit is divided into a plurality of parts, because in this way the melt material can easily be pushed inwards from the visible surfaces into the profile chambers. Within the scope of the invention, it is also conceivable that the heating element is also formed in a plurality of parts, i.e. consists of more than two parts, in order to direct even more melt material into the interior chambers, e.g. from front to back, from back to front, from top to bottom, and from bottom to top.

After the heating unit has been removed between the profile ends to be joined, moldings can be inserted between the limiting blades for shaping and/or displacing the melt material. The moldings serve to deform the profile edge, which, on the one hand, is advantageous for the optics and also to compensate for profile tolerances. On the other hand, melt material is prevented from escaping upwards from the layer surface during the joining process By means of a molding, the profile edge of the respective profile that limits the joining surface on the outside can be deformed at least in sections inwards in the direction of the joining surface. The profile edge, i.e. the edge of the joining surface, is hereby to be given an "alignment" in which it is displaced during the subsequent joining step and the swaging carried out. During the swaging, the profile edge moves inwards towards the joining surface, so that a so-called "shadow groove" or V-groove is created quasi automatically at the connection point and, at the same time, a visible escape of base material that can lie underneath the color layer on the profile surface is counteracted. Any differences in height between the joined profile parts can be concealed or optically compensated in this way.

The type and nature of the post-processing can be adjusted as required using the moldings. It is also conceivable that the moldings process both profiles at the same time.

In principle, a processing by the moldings can be carried out in such a way that both the respective profile edge of the profile is deformed by means of the molding before the joining step and a shape is impressed on the joint line resulting from the weld seam during or after the end of the joining step. In this case, the molding for deforming the profile edges can be moved towards the ends of the profiles in order to deform the profile edges. The molding can then be left in this position while the profile ends are moved towards one another in the joining step and are thereby swaged in order to form the weld connection. The shape imprinted on the resulting joint line results from the shape of the processing surfaces of the molding, which are connected to the profile during swaging.

However, it is also conceivable that the processing by the moldings also takes place in two stages. In particular, it can be provided that the post-processing is carried out in such a way that the respective profile edge of the profiles is deformed in a first processing stage before the joining step by means of a molding. In a second processing stage, which takes place during or after the joining step, i.e. swaging, the joint line resulting from the weld seam can be shaped using a molding. For this purpose, the molding can be pulled back and moved again onto the joint. For example, a V-shaped groove can be embossed here.

The molding can be used in order to limit the flow of melt material towards the face during the joining step. This can be used, for example, to impress a specific shape on the joint line resulting from the weld seam, for example the aforementioned V-shaped groove.

Finally, the profile ends are swaged against one another so that the profiles are joined together. In other words, in a joining step, the profiles are pressed against one another at the partially melted joining surfaces until the melt brought into contact there cools and solidifies, forming a weld connection.

The region or point up to which the profile is melted is also referred to as the melt endpoint. Because the swaging process also begins at this point during the joining step, the same region is also referred to as the the swaging path start. The so-called joint endpoint or swaging path end is offset thereto in the joining or swaging direction. During the swaging, the respective profile is shortened up to the joint endpoint.

The method according to the invention thus serves on the one hand to increase the corner strength of the joined profiles, and on the other hand the method has a positive influence on the appearance of the visible surfaces that result from the melting and swaging process. The decorative/protective film does not have to be removed manually before the joining process According to a first advantageous embodiment of the method according to the invention, a relative movement between each heating element and at least one joining surface is carried out in a joining plane which is substantially parallel to the at least one joining surface. This has the advantage that the melt path is not changed by the relative movement of the heat reflector over the entire miter surface; in particular, the contact of the joining surface with the heating element is not lost.

The two heating elements of the heating unit are preferably moved and positioned horizontally and/or vertically, in particular the two heating elements are moved against one another and/or in the direction from the inner to the outer corner of the joined profiles. In other words, the two heating elements are moved toward one another and "backwards". In an embodiment in which the heat reflector unit has two heating elements, each part of the two heating elements can be moved in the vertical direction by means of a motor. The complete heat reflector unit can be moved horizontally by means of a motor. These movements can be superimposed and thus interpolated by means of a controller.

According to a further embodiment, it is possible for each heating element to have at least two heating surfaces, each of which is assigned to a joining surface of a profile end to be joined. In this way, the two miter surfaces to be joined can be processed at the same time.

According to an advantageous development of the invention, the horizontal and/or vertical movement of each heating element is controlled independently of one another. The profiles can be designed differently on the top and bottom, so that each side can be processed individually due to to the independent control of each heating element. If necessary, profiles can only be processed on one side. The independence of the movements increases the possibilities and thus the flexibility of the apparatus.

According to a further advantageous embodiment of the method, it is provided that one cutting blade having preferably a plurality of cutting edges is arranged on each heating element, wherein the lower visible surface of the profile end has an assigned lower cutting blade and the upper visible surface has an assigned upper cutting blade. The advantage of this arrangement is, on the one hand, that the cutting blades are heated by the heating elements, so that cutting works better and more easily. Furthermore, it has a cost advantage because, in the prior art, motors are required for the movements of the heating unit and the heating elements for generating the relative movements. Separate motors for chamfering the profile contour are also required for the cutting blades. Due to the fact that a cutting blade is arranged on each heating element, the apparatus is more compact and less expensive, as no separate motors are required for the cutting blades.

According to a further variant of the invention, the ablation depth of the ablated coating or profile edge layer on the profile when viewed in the miter direction has the same dimensions as at least the melt end path during the melting process. The swaging residual mass can remain unprocessed. This is because only the coating or decorative/protective film is ablated on the visible surface up to the end of the melt path. The remaining part of the burn-off, the joining path, or swaging path is not changed or is ablated as little as possible. This reduces the material ablation to a minimum so as not to unnecessarily weaken the strength of the corner joint.

In a further development of the invention, it is provided that the profile edge layer is ablated up to a separating region line, and a joint endpoint line marks the region up to which the profile is swaged on its profile wall during the joining step and the profile is melted up to a melt endpoint line, and wherein the separating region line and the melt endpoint line or the separating region line and the joint endpoint line coincide or the separating region line lies between the melt endpoint line and the joint endpoint line.

In a further development of the invention, the cutting blade is heated, in particular by means of the heating unit. In this way, no additional components are required in order to heat the cutting blades, and the heating unit can be used multiple times, on the one hand to melt the ends of the profile and on the other hand to heat the cutting blades.

The molding can be positioned between the limiting blades before the swaging process of the profile ends This ensures that no material penetrates to the outside, wherein, in the final stage, i.e. after the end of the swaging process, the molding itself can be slightly displaced upwards or downwards even relative to the limiting blades in the case of the upper visible surface. This achieves a clean finish on the visible surface in the miter region.

Shortly before the start of swaging, the moldings can be inserted between the limiting blades in order to prevent the molten plastic mass from penetrating to the outside at the joining zones. On the other hand, the unprocessed swaging residual mass is formed inwards by the shaping of the moldings, which leads to the actual end result of the visible surface optics.

In a further development of the invention, the heating elements are fitted with coated, preferably Teflon-coated, corrugated, and/or toothed heating plates, in particular on both sides, in order to convey the molten plastic mass that forms between the tooth gaps or the roughened surface during the melting process in a defined direction, i.e. into the profile interior or the profile chambers.

According to an independent aspect of the invention, a frame is provided, in particular a window frame or door frame, which has profile parts that are welded together, characterized in that at least one of the weld connections is produced according to a method described above.

The apparatus proposed herein for welding at least two profiles for window or door frames can be designed in particular for the production of profile parts made of thermoplastic material for window or door frames and casements or leaves.

The apparatus has at least one heating unit that can be introduced between the profile ends to be joined, with at least two heating elements for melting the profile ends on their future joining surfaces, wherein, for the chamfering, in particular the ablating of a profile edge layer of the profile ends along their visible surfaces, at least one tool arranged on the heating elements of the heating unit, in particular at least one cutting blade, is provided, which can be moved in such a way that the melt material is displaced into the profile interior or into the interior of the profile chambers. A swaging apparatus is provided for swaging the profile ends.

The apparatus according to one embodiment of the invention can also be designed in such a way that the heating elements can be moved and positioned horizontally and/or vertically by means of servomotors, in particular that the two heating elements are movable opposite one another and/or in the direction from the inner to the outer corner and/or from the outer to the inner corner of the joined profiles.

It has proven to be advantageous when one cutting blade having preferably a plurality of cutting edges is arranged on each heating element, wherein the lower visible surface of the profile end has an assigned lower cutting blade and the upper visible surface has an assigned upper cutting blade.

At least one molding for shaping the melt material can be inserted between the limiting blades. Furthermore, it is conceivable that the moldings are designed for the simultaneous processing of the two profiles to be joined together. This makes a time-saving, synchronous processing of the profile ends easier. Furthermore, the moldings can be moved with just one drive.

The molding can preferably have a processing surface which can be brought into contact with the profile part and runs at an angle of greater than 0° to the joining surface, at least in sections. In this way, the profile edge can be deformed in a gentler and more controlled manner after the separating step.

Furthermore, it is possible to form the molding with at least one second processing surface, which adjoins the first processing surface and runs at a different angle to the joining surface. Such a design enables a particularly careful and targeted processing of the profile ends or the weld seam before and during the joining step.

Further objectives, advantages, features, and applications of the present invention are derived from the subsequent description of an embodiment by way of the drawings. All described and/or depicted features per se or in any combination constitute the subject matter of the present invention, regardless of their summary in the patent claims or their back-reference.

DESCRIPTION OF THE DRAWINGS

The following are shown schematically.

Figure 1:
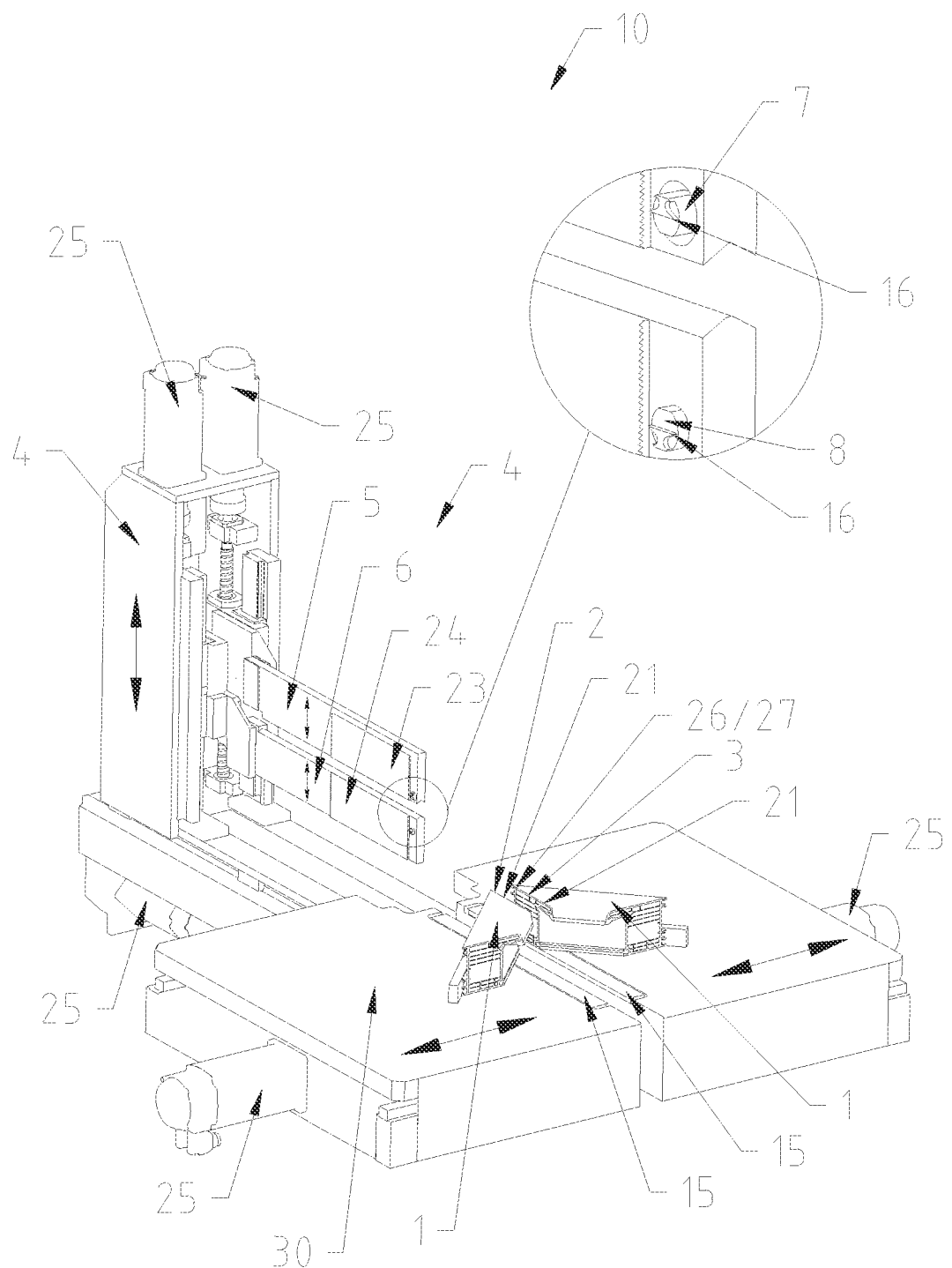
FIG. 1 a perspective view of the apparatus according to the invention.

Identical or identically functioning components are provided with reference numerals based on multiple embodiments in the subsequently depicted figures of the illustrations in order to improve readability.

DETAILED DESCRIPTION

The present invention relates to a method and an apparatus 10 in the form of a welding machine for welding at least two profile parts or profiles 1 for window or door frames and casements or leaves. An overview of the apparatus 10 is shown in FIG. 1 as well as in FIG. 14, in which the profiles 1 to be joined to one another can be seen, which face one another with their joining surfaces 26, 27. The respective method steps are generally carried out on both profiles 1 simultaneously.

In the present case, the profile 1 is a profile element 1 made of thermoplastic material, for example PVC, for the production of a window casement or door leaf. The profile 1 is designed as an extruded profile having a plurality of profile walls 28 running parallel, transversely, and at an angle to one another, whose outermost border forms the profile edge 29. The profile 1 comprises, on the one hand, the lower 17 and the upper visible surface 18 and, on the other hand, functional surfaces which form the outer surfaces of the profile 1. The visible surfaces 17, 18 are the surfaces visible to the outside in the fully assembled state of the window or door. The functional surfaces are those surfaces that are required for the various functions of the window casement, such as the overlap that seals the window against the window frame, the support surface that supports a window pane inserted in the window, and other functional surfaces on which, for example, pane seals are arranged.

The profile 1 is first cut to the profile blank length, which is longer by the so-called burn-off than the final dimension required for the joined profile 1.

Figure 14:
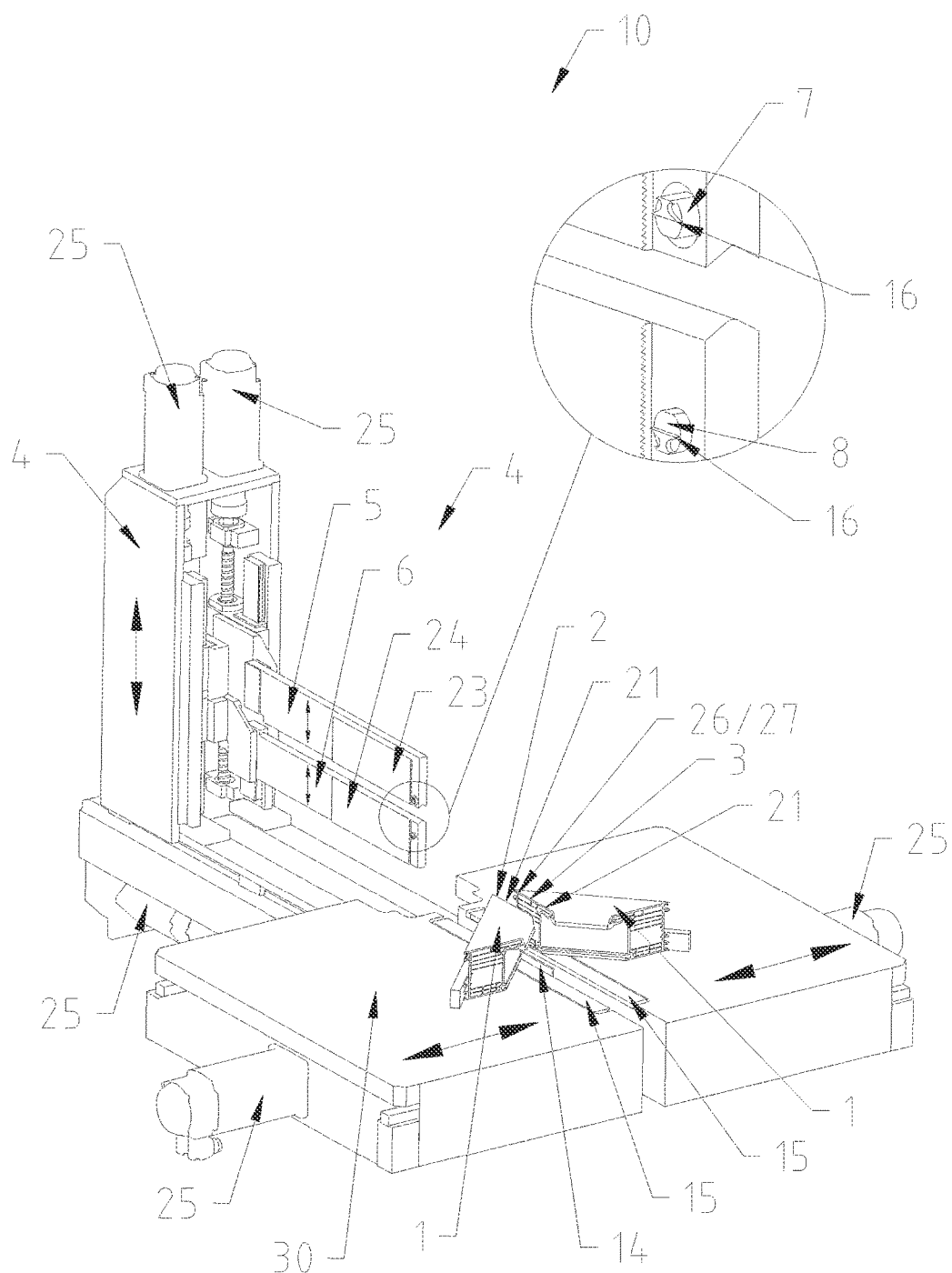

In particular, in FIG. 1 and FIG. 14, the so-called positioning step, which can be part of the method according to the invention, is shown schematically. In this positioning step, the respective profile 1 is pressed with its joining surface 26, 27 against a stop surface (not shown) of a profile stop in order to align the joining surface 26, 27 with the stop surface. Both profiles 1 can be positioned simultaneously if they are pressed against the stop surfaces of the profile stop in order to align the respective joining surfaces 26, 27 with respect to the profile stop and thus with a heating unit 4 and with one another.

After the profile part 1 is aligned with the profile stop, the profile 1 is clamped tightly on the profile support 30 such that no significant movement between the profile 1 and the profile support 30 can take place in the following steps.

Figure 2:
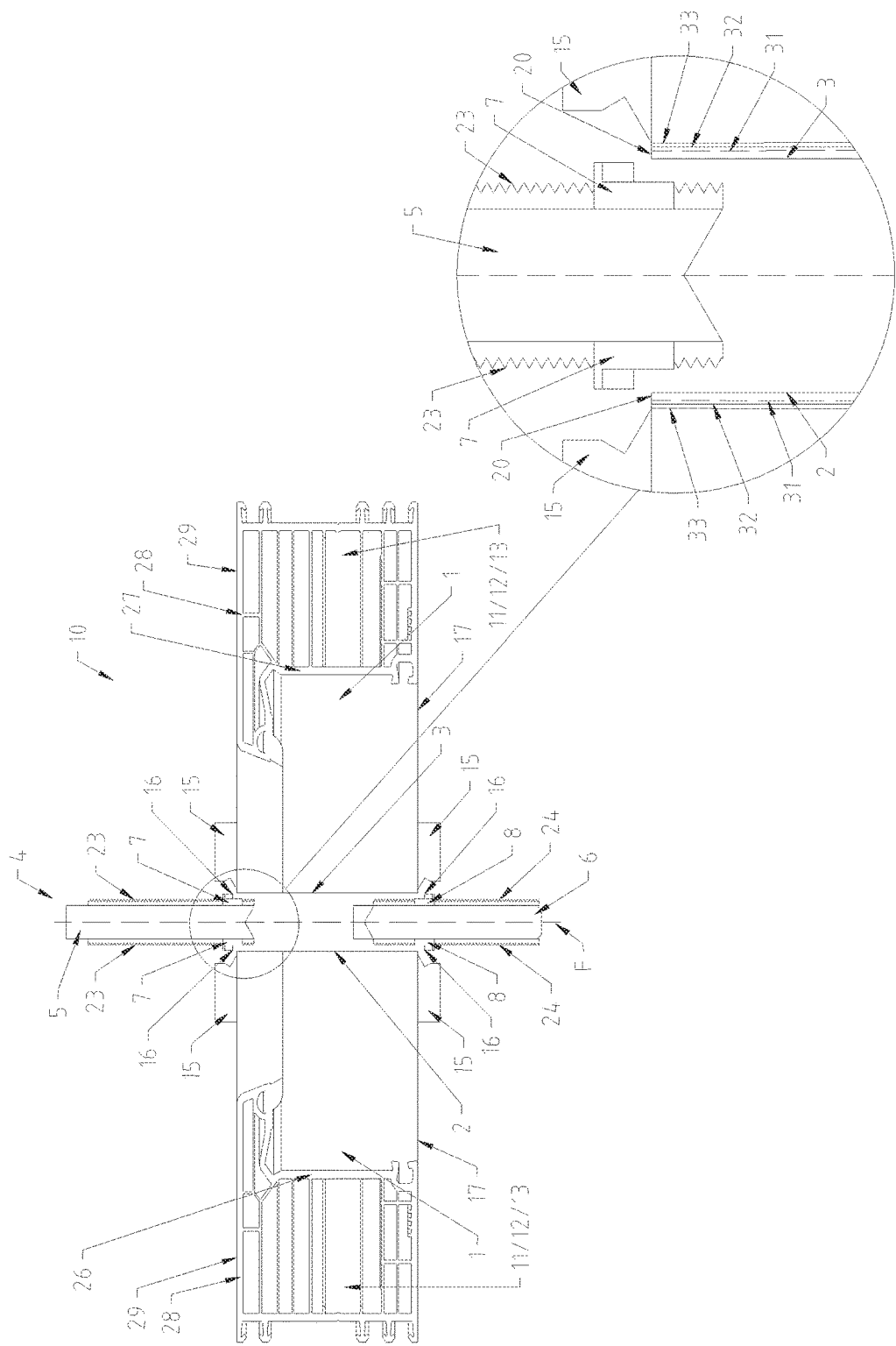
FIG. 2 a sectional view of the apparatus according to the invention in a first position before the ablation of a profile edge layer, FIG. 3 a sectional view of the apparatus according to FIG. 2 in a further position during the ablation of the profile edge layer, FIG. 4 a detailed view according to FIG. 3, FIG. 5 a sectional view of the apparatus according to FIG. 1 in a further position at the beginning of the melting process, FIG. 6 a sectional view of the apparatus according to FIG. 5 in a further position at the end of the melting process, FIG. 7 a detailed view according to FIG. 6, FIG. 8 a sectional view of the apparatus according to FIG. 5 in a further position at the end of the melting process and opened table supports, FIG. 9 a sectional view of the apparatus according to FIG. 1 with a molding shortly before the start of the swaging process, FIG. 10 a sectional view of the apparatus according to FIG. 9 with the swaging process already started, FIG. 11 a sectional view of the apparatus according to FIG. 9 in a further position at the end of the swaging process, FIG. 12 different configurations of a groove, FIG. 13 a sectional view of the apparatus according to FIG. 2 in two further positions during the ablation of the profile edge layer, and FIG. 14 a perspective view of a further embodiment of the apparatus according to the invention according to FIG. 1 with the molding.

According to FIG. 1 and FIG. 14, at least one limiting element in the form of a limiting blade 15 is arranged on the profile support 30, which rests on the outer surface of the profile part 1, here on the lower visible surface 17 hidden in FIG. 2, and in doing so touches the joining surface 26, 27 of the Profile 1 adjacent.

The apparatus 10 also has a heating unit 4 with at least two heating elements 5, 6, which in the present case are designed as heat reflectors, as shown in FIGS. 1 to 8. The two heating elements 5, 6 of the heating unit 4 can be moved and positioned horizontally and/or vertically by means of a servo motor 25; in particular, the two heating elements 5, 6 can be moved towards one another and/or in the direction from the inner to the outer corner and/or from the outer to the inner corner of the joined profiles 1, as can also be seen in FIG. 1. The horizontal and/or vertical movement of each heating element 5, 6 can be controlled independently of one another.

A relative movement is carried out between each heating element 5, 6 and at least one joining surface 26, 27 in a joining plane F, which is substantially parallel to the at least one joining surface 26, 27, as illustrated in particular in FIG. 2.

Each heating element 5, 6 has at least two heating plates or heating surfaces 23, 24, which are each associated with a joining surface 26, 27 of a profile end 2, 3 to be joined. The heating elements 5, 6 can be fitted with coated, preferably Teflon-coated, corrugated, or toothed heating surfaces 23, 24, in particular on both sides.

As can be seen from FIGS. 1 to 4 and 14, in particular the corresponding detailed views, a tool is arranged on each heating element 5, 6, in the present case in the form of a cutting blade 7, 8 with preferably a plurality of cutting edges 16, wherein the lower visible surface 17 of the profile end 2, 3 has an assigned lower cutting blade 7 and the upper visible surface 18 has an assigned upper cutting blade 8. The cutting blades 7, 8 can be heated in particular by means of the heating unit 4, which is the case in the present embodiment of the invention.

The visible surfaces 17, 18 are processed on their respective profile edge layer 20 by means of these cutting blades 7, 8, i.e. the profile ends 2, 3 are preferably chamfered at least in the melt path along their visible surfaces 17, 18, and a chamfer is produced towards the visible surface 17, 18. The outer profile edge layer 20 of the profile 1 is thus removed. Through this ablation of material in the visible surface region of the profile 1, the material of the outermost profile edge layer 20 in the region of the visible surface 17, 18, which is harmful to the corner strength, is removed. The profile edge layer 20 can also contain the protective film or the decorative film of the profile 1 itself. FIG. 2 shows the profile edge layer 20 in a detailed view.

In addition, tests have shown that, even in the case of profiles 1 without any protective and/or decorative films, particles or components are contained on or in the profile edge layer 20 in the region of the visible surface 17, 18, which are extremely damaging to the corner strength of the joined profiles 1, for example, necessary means of PVC profile extrusion, impurities from storage and/or transport, or the like. In addition, experience shows that profile surfaces cut immediately before joining achieve significantly higher corner strength values than unprocessed surfaces.

For this reason, it is advantageous to remove only the outer profile edge layer 20 of the profile 1. As a result, as much material as possible remains on the profile 1 and is therefore not ablated, so that the strength of the corners is not impaired.

As can be seen from FIG. 13.1, the ablation depth 19 of the ablated coating or profile edge layer 20 on the profile 1 seen in the miter direction 21, i.e. the separating region line 32, preferably has the same dimensions as at least the melt end path 31 during the melting process. Furthermore, other ablation depths 19 and thus other separating region lines 32, for example between the melt endpoint line 31 and the joint endpoint line 33, are also conceivable, as can be seen from FIG. 13.2.

As FIGS. 1 to 8 further illustrate, the heating unit 4 with the heating elements 5, 6 is positioned between the profile ends 2, 3 of the profiles 1 to be joined.

Figure 3:
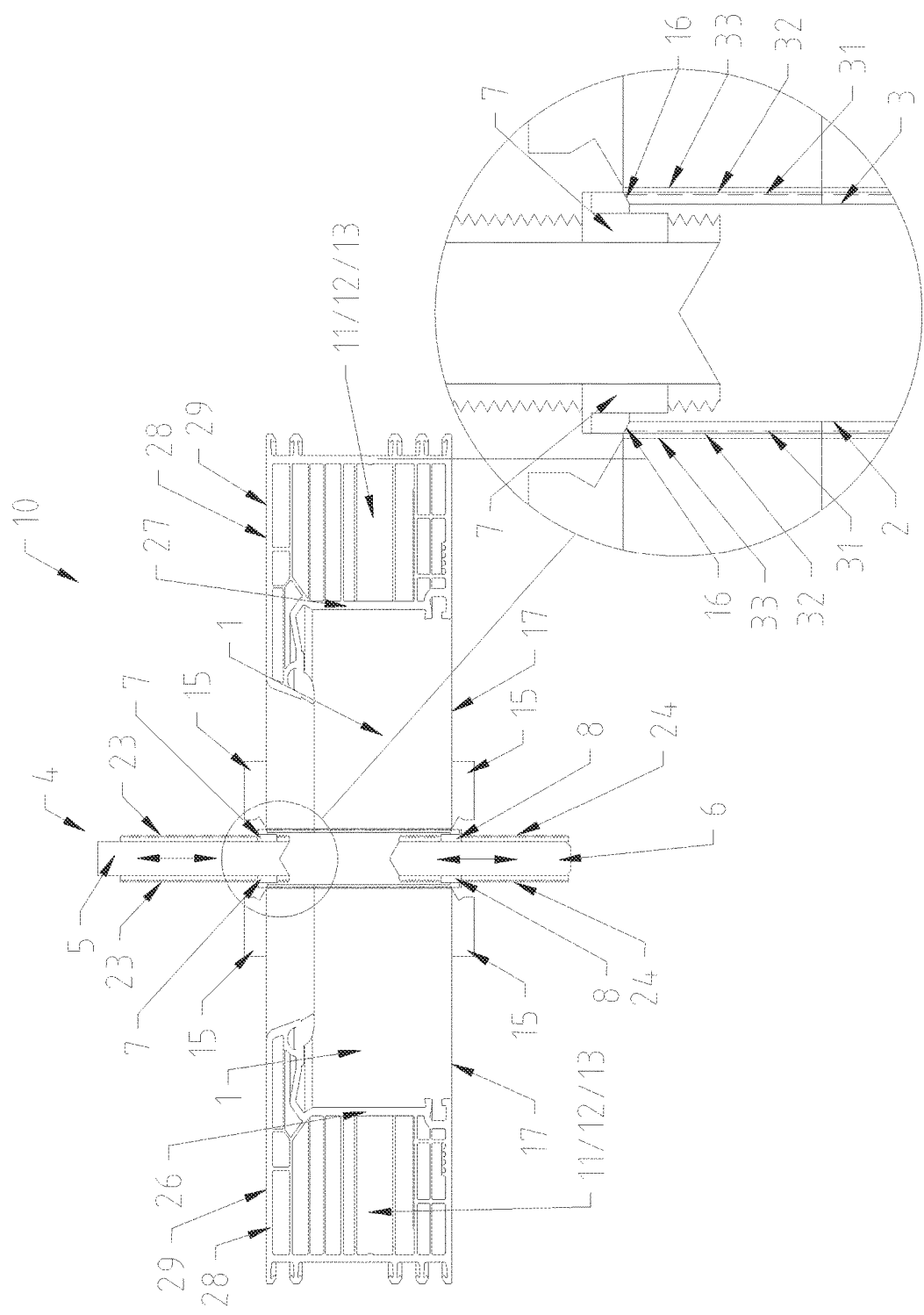
Figure 4:
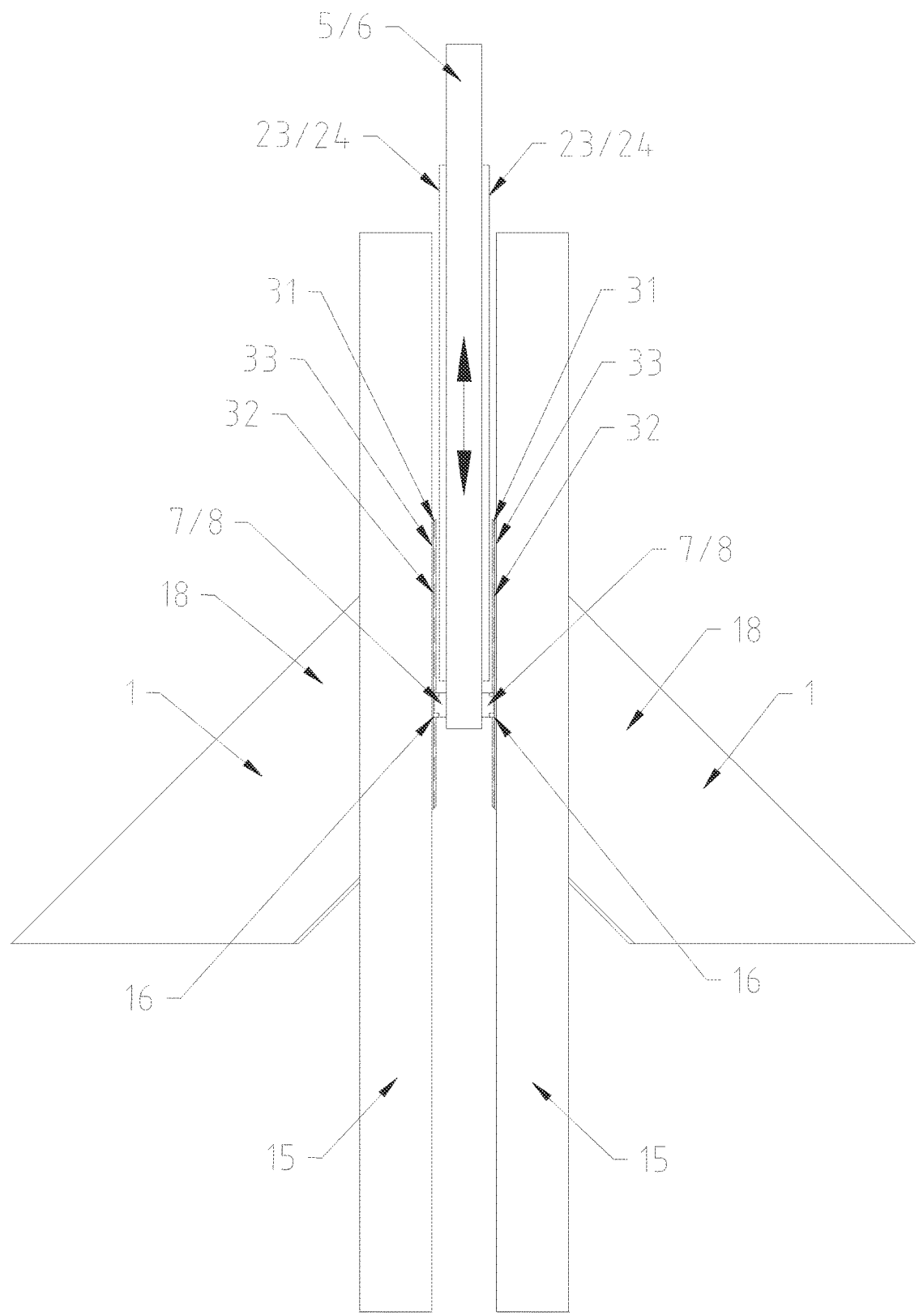

According to FIGS. 3 and 4, in particular the corresponding detailed views, the aforementioned chamfering of the profile ends 2, 3 takes place along their visible surfaces 17, 18 by means of at least one tool arranged on the heating elements 5, 6 of the heating unit 4, in particular by means of the at least one cutting blade 7, 8.

Figure 5:
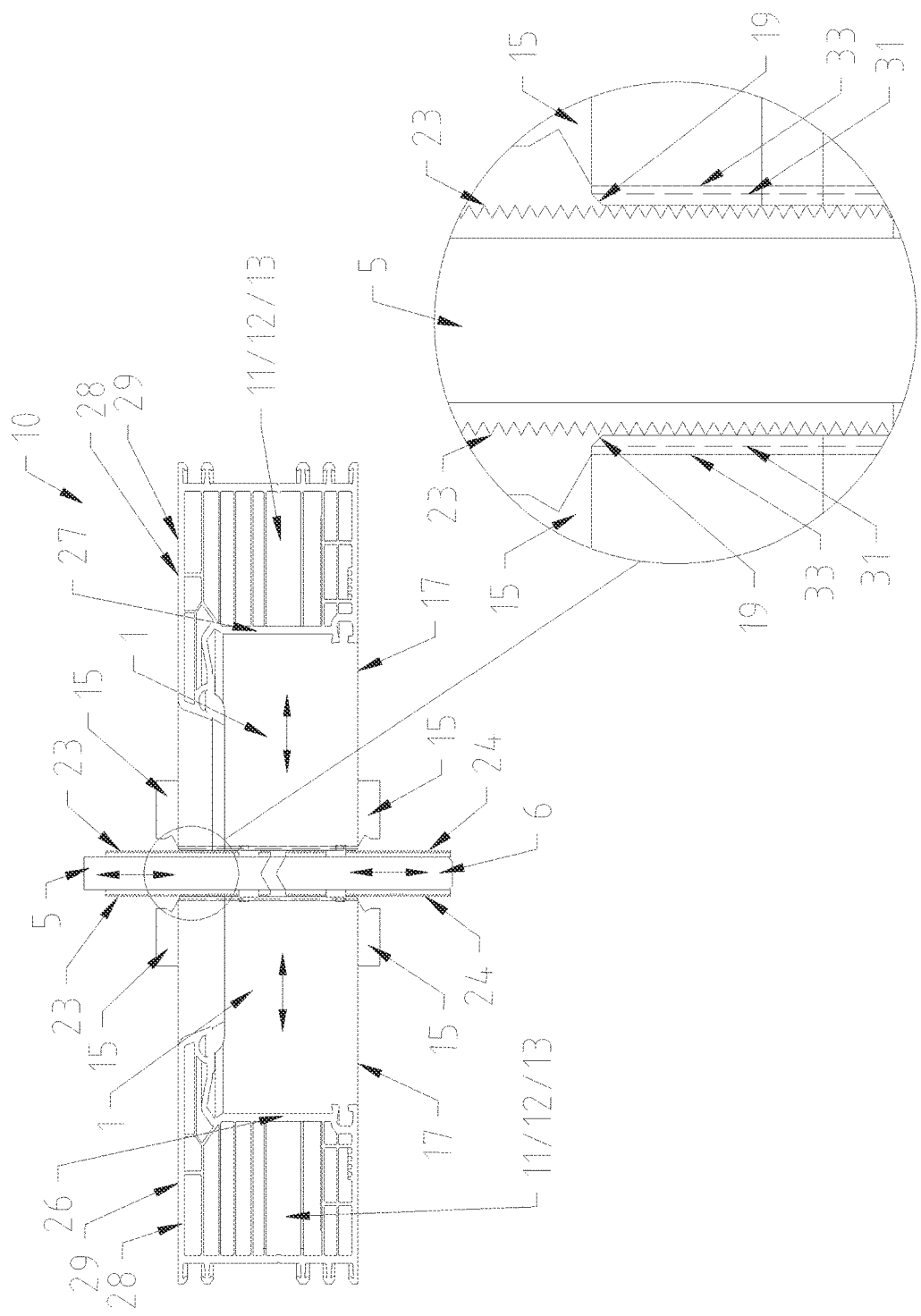

The result can be seen in FIG. 5, in particular from the detailed view there, according to which the profile ends 2, 3 are chamfered, in particular at least up to the melt end path 31. As a result, the geometry of the mechanically removed chip is preferably designed as a slope, i.e. a chamfer. On the one hand, this has the advantage that less material is ablated, which leads to an increase in corner strength, because more material volume is available. On the other hand, the direction of flow of the melt material 9 in the melting process is better guided in the necessary direction, i.e. into the profile interior 11 or the interior 12 of the profile chambers 13.

After the chamfering, the profile ends 2, 3 to be joined together are delivered onto the heating unit 4, as is shown in FIGS. 5 to 8.

Figure 6:
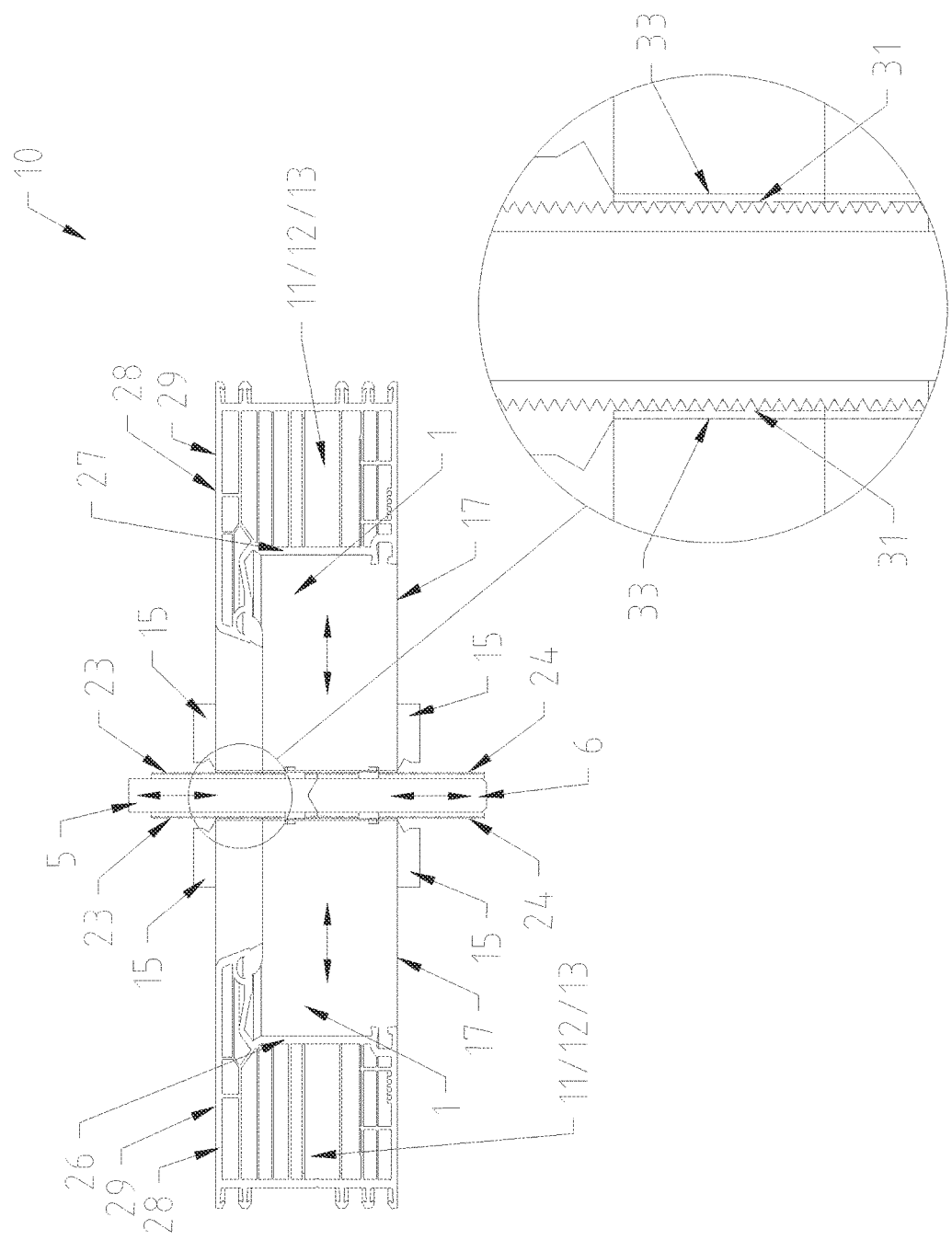
Figure 7:
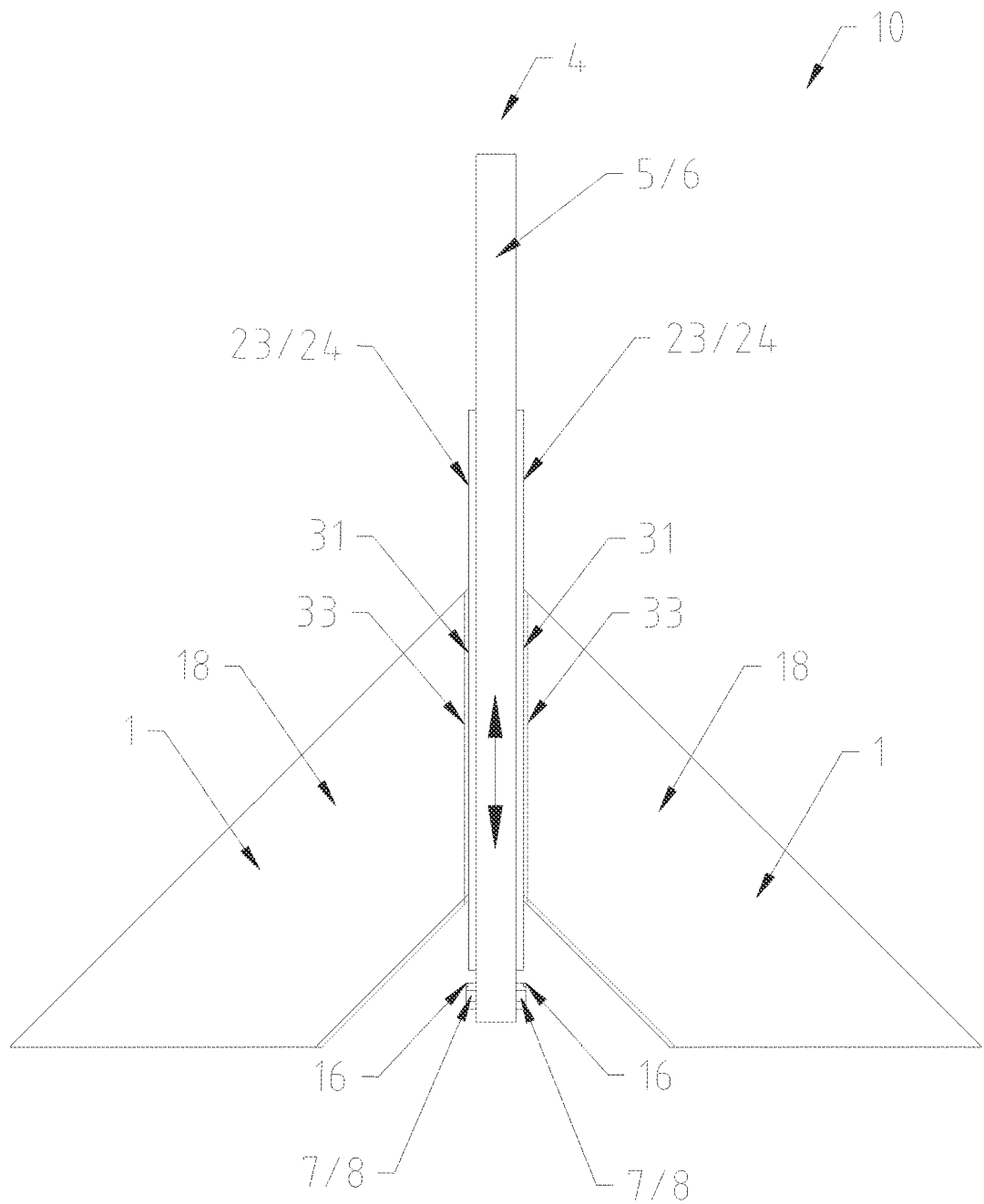
Figure 8:
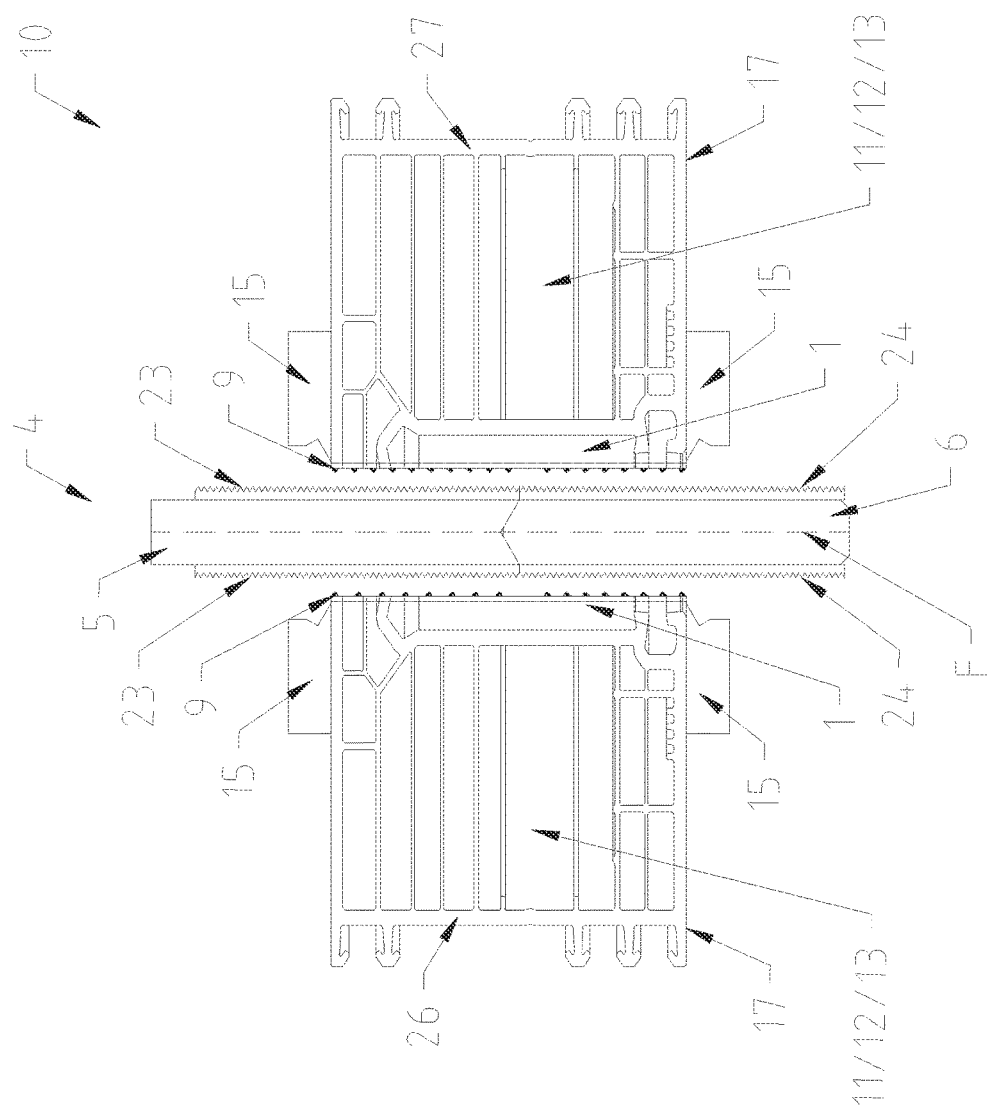

FIG. 5 shows the start, FIGS. 6 and 7 show the end of the melting, and FIG. 8 shows the end of the melting with the profile supports 30 already open. During melting, the joining surface 26, 27 of the profile 1 is pressed against the heating surfaces 23, 24 of the heating unit 4 in order to melt the profile 1 on its joining surface 26, 27 at the front. For this purpose, the respective profile supports 30 can be moved in the direction of the heating unit 4, which has been moved between the joining surfaces 26, 27 of the profile parts 1 after the profile stop has been removed.

According to FIGS. 5 to 8, it is substantial in the present invention that the heating unit 4 is divided into a plurality of parts. This is because the heating elements 5, 6 move in such a way that the melt material 9 is displaced into the profile interior 11 or into the interior 12 of the profile chambers 13 of the profiles 1. In this way, the melt material 9 can be displaced inwards into the profile chambers 13 in a controlled manner from the visible surfaces 17, 18. Within the scope of the invention, it is also conceivable that the heating element 4 is also formed of more than two parts, in order to direct even more melt material 9 into the interior chambers 12, for example from front to back, from back to front, from top to bottom, and from bottom to top.

The melting process includes the melting of the profile 1 up to the melt endpoint, the post-heating, i.e. staying at the melt endpoint so as to generate deep heat, i.e. heating the material to be swaged. In the present case, both are combined to form the melting process, which is used to move the melt material 9 into the profile interior 11 or into the interior 12 of the profile chamber 13.

Furthermore, the melt end path or the melt endpoint line 31 is shown in FIGS. 3 and 5, which marks the region up to which the heating unit 4 penetrates into the material of the profile 1 during the melting process. The material melted in the method escapes as excess melt or melt material 9 and is shifted into the interior of the profile 11 in a controlled manner by the movements of the heat reflector. FIG. 3 shows the cutting process and FIG. 5 shows the introduction of the heating unit 4.

Furthermore, the separating region line 32 between the melt end path or the melt endpoint line 31 and the joint endpoint line 33 is shown in FIG. 3. The separating region line 32 indicates up to which point the profile edge layer 20 is ablation. The joint endpoint line 33 characterizes the region up to which the profile 1 is swaged on its profile wall 28 during the subsequent joining step. The method can also be modified in such a manner that the separating region line 32 and the melt endpoint line 31 coincide, or that the joint endpoint line 33 and the separating region line 32 coincide. However, the arrangement shown in FIG. 2 is preferred, in which the separating region line 32 is provided closer to the melt endpoint line 31 than to the joint endpoint line 33.

Figure 9:
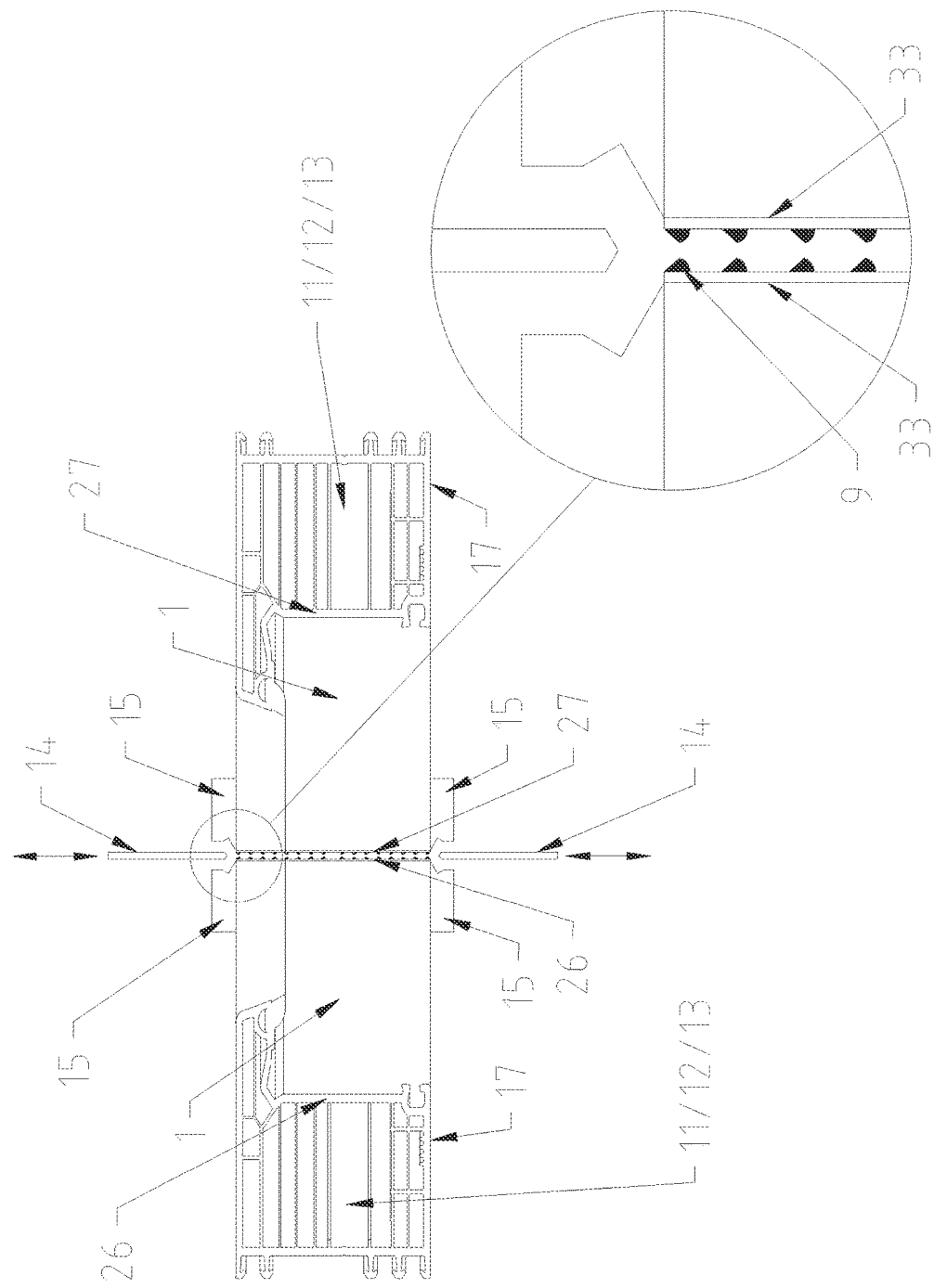
Figure 10:
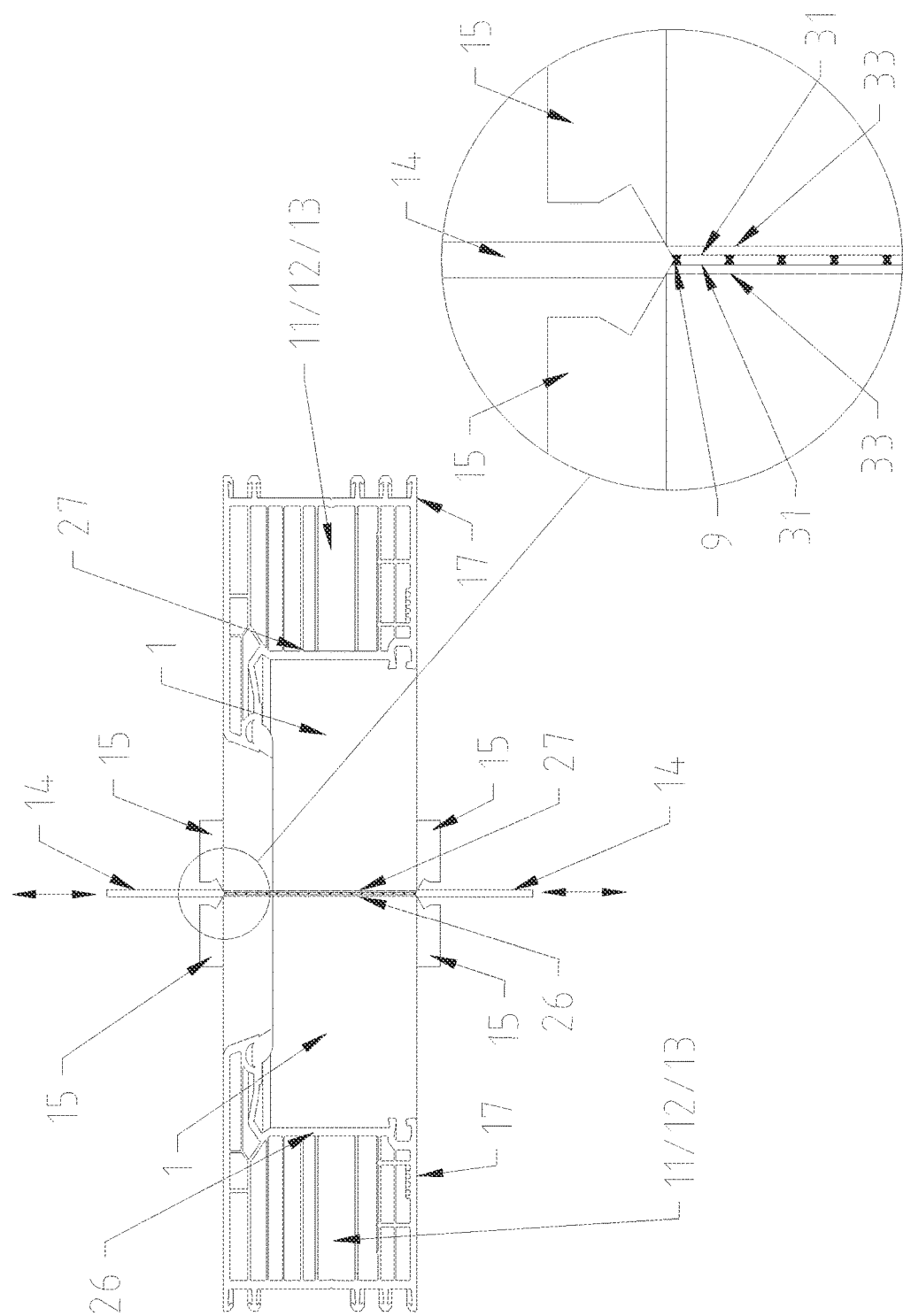
Figure 11:
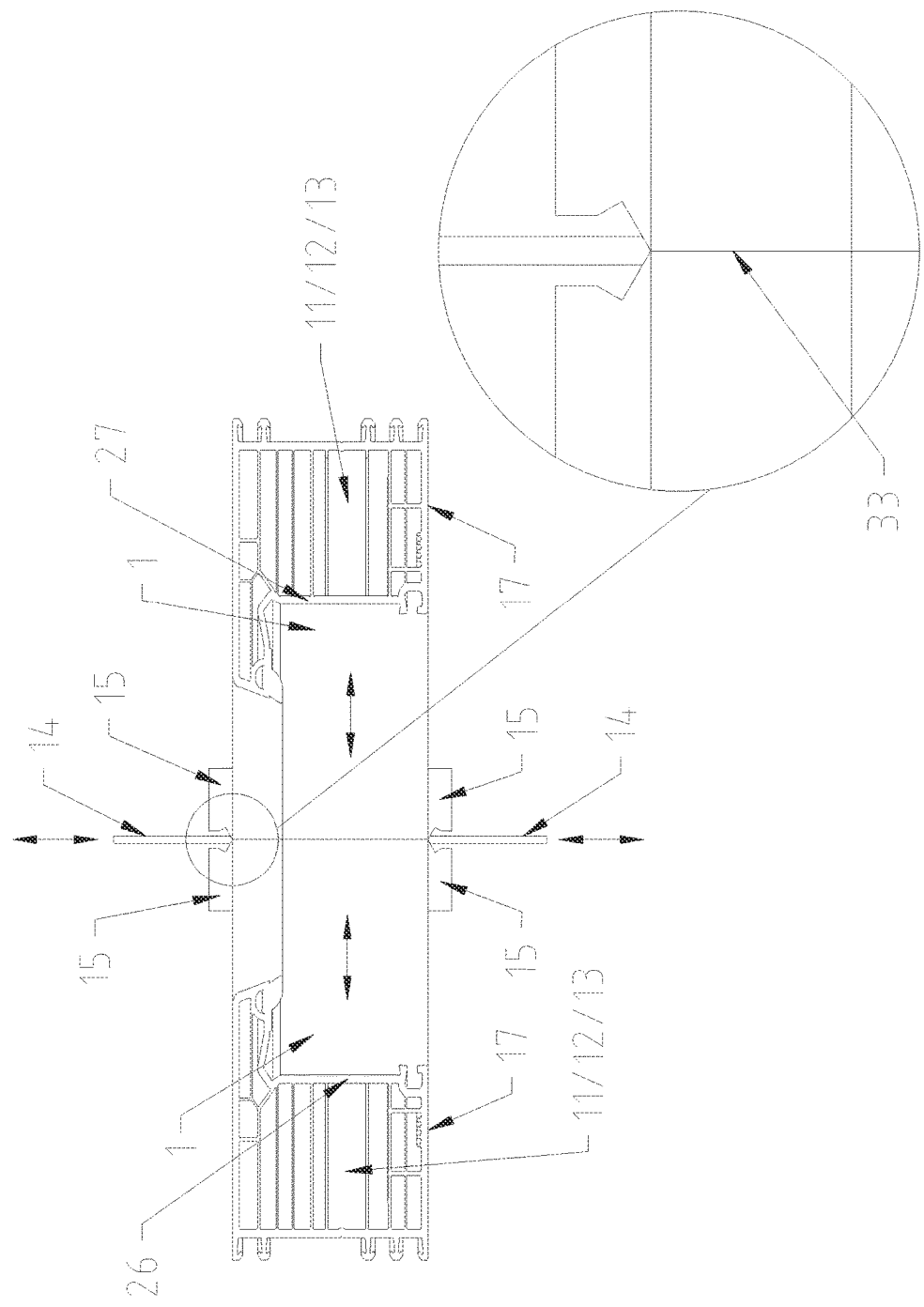

Furthermore, in FIGS. 9, 10, and 11 a molding 14 acting as a post-processing tool is shown. As mentioned, the melt material 9 produced by the partial melting is displaced into the profile interior 11 by the movements of the heat reflector. The molding 14 is intended to prevent heated material from being pushed outwards when the profiles 1 are swaged. The molding 14 can also be seen in FIG. 14.

First, there is a controlled shift of the excess melt or melt material 9 into the interior of the profile 11 using the multi-part heating unit 4. Here, the heating elements 5, 6 are moved in such a way that the melt material 9 is displaced into the profile interior 11 or into the interior 12 of the profile chambers 13 of the profile 1.

After the melt material 9 has been pushed inwards, which is shown in FIGS. 9 to 12, the two profile parts 1 can be processed by means of a molding 14. In the present example, a two-stage post-processing takes place, in which, during the swaging process of the respective profile edge 29, a direction of movement directed inwards onto the joining surface 26, 27 is impressed, so that during the subsequent joining, a V-groove results between the profile parts 1 in the region of the weld. FIG. 12 with its detailed views shows different configurations of this V-groove.

During the shaping and/or displacement of the melt material 9 by means of the molding 14, the profile ends 2, 3 can be swaged against one another in order to join the profiles 1 to one another. It is also conceivable for the profile ends 2, 3 to be swaged against one another without reshaping and/or displacing the melt material 9 by means of a molding 14.

FIG. 9 shows the apparatus shortly before the start of the swaging process, FIG. 10 shows an intermediate position, and FIG. 11 shows the end of the swaging process.

FIG. 10, in particular the detailed view, makes it clear that the contour, i.e. the bevels of the molding 14, touch the limiting blade 15, in particular its contour, i.e. the bevels, and thus terminate the path of the melt material 9 to the outside. The design of the V-groove of the connection can be adjusted via the position, more precisely the distance A, which can be adjusted independently of the profile supports 30, of the limiting blade 15 at the swaging end, as can be seen from FIG. 12. The larger the distance A at the end of the swaging process, the larger the gap between the limiting blades 15. In this way, the molding 14 is pushed less over the bevels of the limiting blade 15 outside the connection, and the molding 14 can remain deeper in the joint plane F, so that a larger V-groove can be realized, as can be seen from FIG. 12.3. With a distance A of zero between the limiting blades 15, the molding 14 is pushed out completely from the profile 1 and no V-groove occurs, as shown in FIG. 12.1. FIG. 12.2 shows an intermediate position.

FIG. 9 shows the position shortly before the start of joining or swaging of the profiles 1. The molding 14 stands above or below the visible surface 17, 18 and is pushed up/down by the swaging process via the bevels or the undercut of the limiting blade 15. Thus, the region for the melt material 9 is already blocked from the outside by the molding 14, and no melt material 9 can penetrate to the outside due to the joining process.

Two measures ensure that the molten material cannot exit at the visible surface 17, 18 during joining/swaging, one measure in the melting process and one measure in the swaging process, respectively.

In the melting process, melt material 9 is moved in a controlled manner into the interior 12 of the profile chambers 13 by the heating unit 4 and its movements during the melting process. In order to ensure that no impurities from the region of the visible surfaces 17, 18 can get into the melt material 9, material and thus possible impurities are ablated from the surface of the profile 1 in the joining region.

Furthermore, during the swaging process, the contour of the molding 14 can shape the heated material between the melting point and the joint endpoint, and at the same time it can prevent the melt material 9 from escaping to the outside due to the form-fit of the bevel of the molding 14 with the bevels of the limiting blade 15 and, depending on the limiting blade position, contribute to the shaping at the swaging end.

The limiting blade 15 can be guided under spring tension in the direction of the joining surface 26, 27 in order to form the narrowest possible gap between the heating surface 23, 24 and the separating edge during the melting step. The function of the limiting blade 15 can also be supplemented by the molding 14, which minimizes the escaping of the melt material 9 outwards in the melting step. At the same time, the molding 14 can terminate with the joining plane F.

Protective films present on the visible surfaces 17, 18, which are not shown here for the sake of simplicity, can remain on the profile 1 without prior processing and do not impair the aesthetics and the mechanical strength of the joint created according to the invention, or do so only insignificantly.

LIST OF REFERENCE NUMERALS

1 Profile
2 Profile end
3 Profile end
4 Heating unit
5 Heating element
6 Heating element
7 Tool/cutting blade
8 Tool/cutting blade
9 Melt material
10 Apparatus
11 Profile interior
12 Interior of the profile chamber
13 Profile chamber
14 Molding
15 Limiting blade
16 Cutting edges
17 Lower visible surface
18 Upper visible surface
19 Ablation depth
20 Profile edge layer
21 Miter direction
23 Heating surface
24 Heating surface
25 Servomotor
26 Joining surface
27 Joining surface
28 Profile wall
29 Profile edge
30 Profile support
31 Melt end path and melt endpoint line
32 Separating region line
33 Joint endpoint line
F Joining plane
A Distance between the limiting blades

The invention claimed is:

1. A method for welding at least two profiles for window or door frames and casements or leaves, the method comprising the following steps:

providing the at least two profiles, wherein the at least two profiles comprise a first profile having a first profile end and a second profile having a second profile end;

positioning a heating unit having at least two heating elements including a first heating element and a second element between the first and second profile ends;

chamfering each of the first and second profile ends with at least one tool arranged on each of the first heating element and the second heating element to form a chamfer on each of the first and second profile ends;

delivering the first and second profile ends having the chamfer into contact with the first and second heating elements;

melting respective joining surfaces of the first and second profile ends with the first and second heating elements, which contact with the respective joining surfaces;

moving the first and second heating elements to displace melt material formed during melting into an interior of the first and second profiles;

removing the first and second heating elements from between the first and second profile ends; and swaging the first and second profile ends against one another so that the first and second profiles are joined together at the respective joining surfaces.

2. The method according to claim 1, wherein moving the first and second heating elements comprises relative movement between the first and second heating elements in a joining plane (F) substantially parallel to the respective joining surfaces.

3. The method according to claim 1, wherein the first and second heating elements are movable vertically towards and away from one another and/or horizontally towards and away from the first and second profiles.

4. The method according to claim 1, wherein each of the first and second heating elements has at least two heating surfaces.

5. The method according to claim 3, wherein the horizontal and/or the vertical movement of each of the first and second heating elements is independently controlled.

6. The method according to claim 1, wherein the at least one tool arranged on each of the first and second heating elements is a cutting blade having a plurality of cutting edges, and wherein the cutting blade on one of the first or second heating element is configured to operate as lower cutting blade on the first and second profile ends and the cutting blade on the other of the first or second heating element is configured to operate as an upper cutting blade on the first and second profile ends.

7. The method according to claim 1, wherein the chamfer on each of the first and second profile ends has an ablation depth in a miter direction that is at least as deep as a melt end path during the melting process, and wherein the melt end path is an endpoint depth of melting into each of the first and second profile ends in the miter direction.

8. The method according to claim 7, wherein the ablation depth defines a separating region line extending perpendicular to the miter direction, and a joint endpoint line marks the region on each of the first and second profile ends up to which each of the first and second profile ends is swaged during swaging, and wherein either:

the separating region line coincides with either: a melt endpoint line marking the melt end path or the joint endpoint line, or the separating region line lies between the melt endpoint line and the joint endpoint line.

9. The method according to claim 6, wherein each cutting blade is heated by the heating unit.

10. The method according to claim 1, wherein the first and second heating elements are fitted with coated, corrugated, and/or toothed heating plates.

* * * * *